(12) United States Patent
Spencer et al.

(10) Patent No.: US 6,542,968 B1
(45) Date of Patent: Apr. 1, 2003

(54) SYSTEM AND METHOD FOR MANAGING DATA IN AN I/O CACHE

(75) Inventors: Thomas V Spencer, Ft Collins, CO (US); Robert J Horning, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/232,293

(22) Filed: Jan. 15, 1999

(51) Int. Cl.[7] ............................................. G06F 12/00
(52) U.S. Cl. ...................................... 711/137; 711/154
(58) Field of Search ............................... 711/137, 146, 711/154

(56) References Cited

U.S. PATENT DOCUMENTS

| | | | |
|---|---|---|---|
| 5,446,863 A | | 8/1995 | Stevens et al. |
| 5,608,878 A | | 3/1997 | Arimilli et al. |
| 5,652,858 A | * | 7/1997 | Okada et al. ............... 711/137 |
| 5,664,147 A | * | 9/1997 | Mayfield ................... 711/137 |
| 5,673,414 A | | 9/1997 | Amini et al. |
| 5,724,549 A | | 3/1998 | Selgas et al. |
| 5,732,243 A | * | 3/1998 | McMahan .................. 711/137 |
| 5,778,436 A | * | 7/1998 | Kedem et al. .............. 711/137 |
| 5,809,022 A | | 9/1998 | Byers et al. |
| 5,860,105 A | * | 1/1999 | McDermott et al. ........ 711/135 |
| 6,003,106 A | * | 12/1999 | Fields, Jr. et al. .......... 710/129 |

* cited by examiner

*Primary Examiner*—Matthew Kim
*Assistant Examiner*—Matthew D. Anderson

(57) ABSTRACT

The present invention is generally directed to a system and method for fetching data from system memory to a device in communication with the system over a PCI bus, via an I/O cache. Broadly, the present invention may be viewed as a novel way to communicate certain fetching hints; namely, hints that specify certain qualities about the data that is to be fetched from the system memory. In operation, the I/O cache may use such hints to more effectively manage the data that passes through it. As simply one example, if, based upon the hints, the controller for the I/O cache knew (or assumed) that the data being fetched was ATM data, then it would also know (based upon the nature of ATM data) that precisely a forty-eight byte data payload was to be sent to the requesting device, and the I/O cache could pre-fetch precisely this amount of data (typically one or two cache lines). In accordance with one aspect of the invention, such a system includes an input/output (I/O) cache memory interposed between the system memory and the PCI bus, wherein the cache memory has internal memory space in the form of a plurality of data lines within the cache memory. The system further includes a plurality of registers for each PCI master that are configured to define fetching criteria. Finally, the system includes a register selector that is configured to select an active register among the plurality of registers, wherein fetching criteria for the device is specified by the active register.

2 Claims, 6 Drawing Sheets

SYSTEM AND METHOD FOR MANAGING DATA IN AN I/O CACHE

BACKGROUND OF THE INVENTION

1. Field of the Invention

The present invention generally relates to a system and method for fetching data from a system memory to a device, over a Peripheral Component Interconnect (PCI) bus. More specifically, the present invention is directed to a system and method for efficiently fetching data from a system memory to a device communicating over a PCI bus, based upon hints that are observed from PCI bus transactions.

2. Discussion of the Related Art

In computer system design, a principal objective is to continually design faster and more efficient computer systems. In this regard, most conventional high-performance computer systems include cache memories. As is known, a cache memory is a high-speed memory that is positioned between a microprocessor and main memory in a computer system in order to improve system performance. Typically, cache memories (or caches) store copies of portions of main memory data that are actively being used by the central processing unit (CPU) while a program is running. Since the access time of a cache can be faster than that of main memory, the overall access time can be reduced.

Even though cache memories typically increase system performance, further improvements are desired. For example, consider a computer system having separate busses, such as a system bus that interconnects a central processing unit (e.g., a microprocessor), memory, etc., and an I/O bus (e.g., ISA bus, PCI bus, etc). One of the bottlenecks that has limited the performance of personal computers in the past has been the maximum specified speed of the ISA bus. In original IBM PC AT computers manufactured by IBM Corp., the I/O bus operated with a data rate of 8 MHz (BCLK=8 MHz). This was an appropriate data rate at that time since it was approximately equivalent to the highest data rates which the CPUs of that era could operate with on the host bus. CPU data rates are many times faster today, however, so the slow speed of the I/O bus severely limits the throughput of systems today. One solution for this problem has been the development of local bus standards, by which certain devices which were traditionally located on the I/O bus can now be located on the host bus—e.g., the VESA VL-Bus Local Bus Standard.

Another solution to the problem has been the development of another standard, referred to herein as the PCI standard. As is known, PCI is an acronym for Peripheral Component Interconnect. The PCI standard is a set of guidelines that define a way to connect external devices to a computer, and was originally developed to provide a Local Bus standard that would prevent the rapidly increasing numbers of incompatible bus architectures that were being developed in the early 1990s. In this regard, the PCI Bus replaces the ISA, EISA, VL-Local Bus, MicroChannel, NuBus, and other Local Bus architectures as the preferred primary Local Bus in computer systems.

The PCI bus achieves very high performance, in part because its basic data transfer mode is by burst. That is, data is always transferred to or from a PCI device in a known sequence of data units defined by a known sequence of data unit addresses in an address space. In a "linear" burst mode, any number of transfers (including 1) can take place to/from linearly sequential addresses until either the initiator or the target terminates the transaction. The initiator need only specify the starting address because both parties know the sequence of addresses which follow.

The implementation of the PCI bus is well known in the industry and its specifications are available to the public. In transferring data to and from a high speed industry standard common bus, often it is desirable to provide an intermediate local cache buffer for the data to allow the bus to maintain full bandwidth. That is, it is desirable to maintain full utilization of the I/O bus that interfaces the PCI bus to the cache, without overtaxing the system bus. For example, when data is fetched from memory to the cache, it is fetched one cache line at a time.

When data is first requested by a device on the PCI bus, there is an initial latency period (idle I/O clock cycles) while the first cache line of data is retrieved from memory to the cache. If the PCI transfer requires more than one cache line of data, then another latency period is encountered while the next cache line of data is retrieved from system memory to the cache. Intermittent latency periods are encountered each time a new line of data is read from memory to the cache. It would therefore be desirable to eliminate or significantly reduce these latency periods. One way of achieving this goal is to always pre-fetch an additional cache line of data. For example, initially two cache lines of data could be retrieved from memory to the cache. After the first line of data has been transferred from the cache to the PCI bus and the second line is being transferred to the PCI bus, then an additional cache line of data could be fetched from memory into the cache.

While this approach would reduce the idle cycles encountered on the I/O bus, it realizes an inefficient utilization of system resources. The problem with this approach is that it over-fetches data from memory into the cache (by one cache line). Therefore, it unnecessarily consumes bandwidth of the system bus. In addition, it wastes a portion of the cache memory. Such poor utilization of the cache memory space denigrates overall system performance.

Accordingly, there is a desire to provided an improved system and method for interfacing a cache to a PCI bus that overcomes the above-identified and other shortcomings.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for fetching data from system memory to a device in communication with the system over a PCI bus, via an I/O cache. Broadly, the present invention may be viewed as a novel way to communicate certain fetching hints; namely, hints that specify certain qualities about the data that is to be fetched from the system memory. In operation, the I/O cache may use such hints to more effectively manage the data that passes through it. As one simple example, if, based upon the hints, the controller for the I/O cache knew (or assumed) that the data being fetched was ATM data, then it would also know (based upon the nature of ATM data) that precisely a forty-eight byte data payload was to be sent to the requesting device, and the I/O cache could pre-fetch precisely this amount of data (typically one or two cache lines).

In accordance with one aspect of the invention, such a system includes an input/output (I/O) cache memory interposed between the system memory and the PCI bus, wherein the cache memory has internal memory space in the form of a plurality of data lines within the cache memory. The system further includes a plurality of registers for each PCI master that are configured to define fetching criteria. Finally, the system includes a register selector that is configured to select an active register among the plurality of registers, wherein fetching criteria for the device is specified by the active register.

More particularly, in such a system constructed in accordance with the preferred embodiment of the invention, the registers contain contents that specify certain hints with regard to data fetching. For example, one such hint may be a pre-fetch depth, whereby the registers may contain differing values of pre-fetch depth. A first register may specify a pre-fetch depth of two cache lines, while a second register may specify a pre-fetch depth of three cache lines. It will be appreciated, however, that these register contents may be dynamically varied by different sources. In one instance, system firmware may set the contents of the registers. Alternatively, the register contents may be set or altered under the control of a driver on the requesting device. The register selector then determines which register to "select" as the active register, which is the register used by the controller for the I/O cache for controlling the data therein. This selector may be configured to monitor the PCI bus to identify requests for data and, based on the manner of the request, the identification of the requesting device, or other factors, the selector "selects" the active register.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
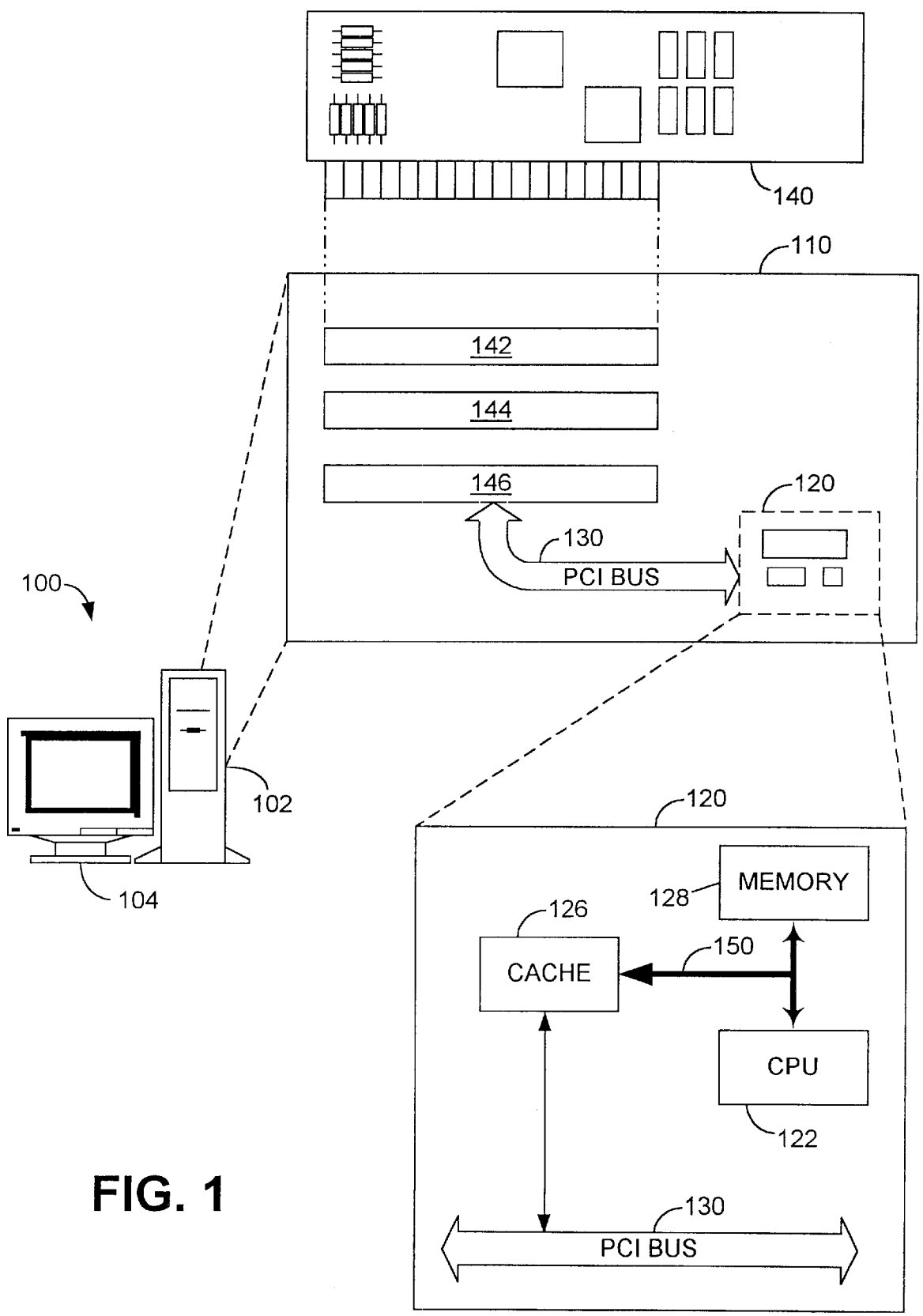
FIG. 1 is a block diagram of high-performance computer system in communication with the cache memory across a PCI bus.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Referring now to the drawings, reference is made to FIG. 1, which shows a computer system 100 defining an environment that typifies the environment of the present invention. In this regard, the computer system 100 may be any of a variety of high-performance computing systems, such a high-end desktop computing system having a computer 102 and monitor 104. Although the computer 102 may come in a variety of forms, a typical computer 102 will include a motherboard 110. As is known, the motherboard 110 typically includes various on-board integrated circuit components 120. These on-board integrated circuit components 120 may include devices like a CPU 122 (e.g., a microprocessor), a memory 128, and a variety of other integrated circuit devices known and included in computer architectures.

Another integrated circuit device, whether located on the motherboard or located on a plug-in card, is a cache memory 126. The cache memory 126 is disposed in communication with a PCI bus 130. Consistent with the concepts and teachings of the present invention, a variety of other circuit components may be included within the computer system 100 as well. Indeed, a variety of other support circuits and additional functional circuitry are typically included in most high-performance computing systems. The addition and implementation of other such circuit components will be readily understood by persons of ordinary skill in the art, and need not be described herein. Instead, the computing system 100 of FIG. 1 has been illustrated with only a select few components in order to better illustrate the concepts and teachings of the present invention.

As is further known, in addition to various on-board circuit components, computing systems usually include expansion capability. In this regard, most computing systems 100 include a plurality of expansion slots 142, 144, 146, which allow integrated circuit cards to be plugged into the motherboard 110 of the computing system 100. More particularly, expansion cards 140 typically provide some specialized functionality that may not be desired for all uses of a computing system, but rather for specialized uses of certain user groups. For example, a modem card (not shown) allows a computing system 100 to communicate voice, data, and other information to remote computing systems or users over a telecommunication link. It will be appreciated that items like the CPU 122, the memory 128, and the cache 126, although illustrated as being disposed on the motherboard 110, may be provided instead on expansion cards. It will be appreciated that the particular embodiment illustrating FIG. 1 has been presented merely for purposes of illustration and should not be deemed to be limiting on the scope the present invention.

Although a variety of expansion cards may be utilized in connection with the computing system 100, for purposes of the present invention, only one has been illustrated. Also illustrated in FIG. 1 are both a system bus 150 and a PCI bus 130. Generally speaking, the system bus 150 is a high-speed bus that interconnects the memory 128, the CPU 122, the cache 126, and other devices (not shown) that may be included within the computing system 100. Communications to and from the expansion card 140 may be communicated to the remainder of the computing system 100 via the PCI bus 130. As will be further described below, the present invention is directed to a system and method for enhancing the overall performance, operation, and efficiency of the computing system 100 when fetching data from the system memory 128 to the PCI bus 130 for communication via the expansion card 140.

However, before discussing the specifics of the present invention, some fundamental information will first be provided on cache memory devices. This information is provided merely for purposes of completeness in describing systems constructed in accordance with teachings of the present invention. It should be understood, however, the persons of ordinary skill in the art will understand and appreciate the concepts and operation of cache memory devices set forth below.

Cache Basics

As previously mentioned, a cache memory is a high-speed memory that is positioned between a microprocessor and main memory in a computer system in order to improve system performance. Cache memories (or caches) store copies of portions of main memory data that are actively being used by the central processing unit (CPU) while a program is running. Since the access time of a cache can be faster than that of main memory, the overall access time can be reduced.

Many microprocessor-based systems implement a "direct mapped" cache memory. In general, a direct mapped cache memory comprises a high-speed data Random Access Memory (RAM) and a parallel high-speed tag RAM. The RAM address of each line in the data cache is the same as the low-order portion of the main memory line address to which the entry corresponds, the high-order portion of the main memory address being stored in the tag RAM. Thus, if main memory is thought of as $2^m$ blocks of $2^n$ "lines" of one or more bytes each, the $i^{th}$ line in the cache data RAM will be a copy of the $i^{th}$ line of one of the $2^m$ blocks in main memory. The identity of the main memory block that the line came from is stored in the $i^{th}$ location in the tag RAM.

When a CPU requests data from memory, the low-order portion of the line address is supplied as an address to both the cache data and cache tag RAMs. The tag for the selected cache entry is compared with the high-order portion of the CPU's address and, if it matches, then a "cache hit" is indicated and the data from the cache data RAM is enabled onto a data bus of the system. If the tag does not match the high-order portion of the CPU's address, or the tag data is invalid, then a "cache miss" is indicated and the data is fetched from main memory. It is also placed in the cache for potential future use, overwriting the previous entry. Typically, an entire line is read from main memory and placed in the cache on a cache miss, even if only a byte is requested. On a data write from the CPU, either the cache RAM or main memory or both may be updated, it being understood that flags may be necessary to indicate to one that a write has occurred in the other.

Accordingly, in a direct mapped cache, each "line" of secondary memory can be mapped to one and only one line in the cache. In a "fully associative" cache, a particular line of secondary memory may be mapped to any of the lines in the cache; in this case, in a cacheable access, all of the tags must be compared to the address in order to determine whether a cache hit or miss has occurred. "k-way set associative" cache architectures also exist which represent a compromise between direct mapped caches and fully associative caches. In a k-way set associative cache architecture, each line of secondary memory may be mapped to any of k lines in the cache. In this case, k tags must be compared to the address during a cacheable secondary memory access in order to determine whether a cache hit or miss has occurred. Caches may also be "sector buffered" or "sub-block" type caches, in which several cache data lines, each with its own valid bit, correspond to a single cache tag RAM entry.

When the CPU executes instructions that modify the contents of the cache, these modifications must also be made in the main memory or the data in main memory will become "stale." There are two conventional techniques for keeping the contents of the main memory consistent with that of the cache—(1) the write-through method and (2) the write-back or copy-back method. In the write-through method, on a cache write hit, data is written to the main memory immediately after or while data is written into the cache. This enables the contents of the main memory always to be valid and consistent with that of the cache. In the write-back method, on a cache write hit, the system writes data into the cache and sets a "dirty bit" which indicates that a data word has been written into the cache but not into the main memory. A cache controller checks for a dirty bit before overwriting any line of data in the cache, and if set, writes the line of data out to main memory before loading the cache with new data.

A computer system can have more than one level of cache memory for a given address space. For example, in a two-level cache system, the "level one" (L1) cache is logically adjacent to the host processor. The second level (L2) cache is logically behind the first level cache, and DRAM memory (which in this case can be referred to as tertiary memory) is located logically behind the second level cache. When the host processor performs an access to an address in the memory address space, the first level cache responds if possible. If the first level cache cannot respond (for example, because of an L1 cache miss), then the second level cache responds if possible. If the second level cache also cannot respond, then the access is made to DRAM itself. The host processor does not need to know how many levels of caching are present in the system or indeed that any caching exists at all. Similarly, the first level cache does not need to know whether a second level of caching exists prior to the DRAM. Thus, to the host processing unit, the combination of both caches and DRAM is considered merely as a single main memory structure. Similarly, to the L1 cache, the combination of the L2 cache and DRAM is considered simply as a single main memory structure. In fact, a third level of caching could be included between the L2 cache and the actual DRAM, and the L2 cache would still consider the combination of L3 and DRAM as a single main memory structure.

If a cache line is in state E ("exclusive"), then it is not "modified" (i.e., it contains the same data as subsequent levels of the memory subsystem). In shared cache systems, state E also indicates that the cache line is available in only one of the caches. The host processor unit can access (read or write) an E-state line without generating a bus cycle to higher levels of the memory subsystem, but when the host processor performs a write access to an E-state line, the line then becomes "modified" (state M).

A line in state S ("shared") may exist in more than one cache. A read access by the host processor to an S-state line will not generate bus activity, but a write access to an S-state line will cause a write-through cycle to higher levels of the memory subsystem in order to permit the sharing cache to potentially invalidate its own corresponding line. The write will also update the data in the data cache line.

A line in state I is invalid. It is not available in the cache. A read access by the host processor unit to an I-state line will generate a "cache miss" and may cause the cache to execute a line fill (fetch the entire line into the cache from higher levels of the memory subsystem). A write access by the host processor unit to an I-state line will cause the cache to execute a write-through cycle to higher levels of the memory subsystem.

Computer system cache memories typically cache main memory data for the CPU. If the cache uses a write-back protocol, then frequently the cache memory will contain more current data than the corresponding lines in main memory. This poses a problem for other bus masters (and for other CPUs in a multiprocessor system) desiring to access a line of main memory, because it is not known whether the main memory version is the most current version of the data. Write-back cache controllers, therefore, typically support inquire cycles (also known as snoop cycles), in which a bus master asks the cache memory to indicate whether it has a more current copy of the data.

Figure 2:
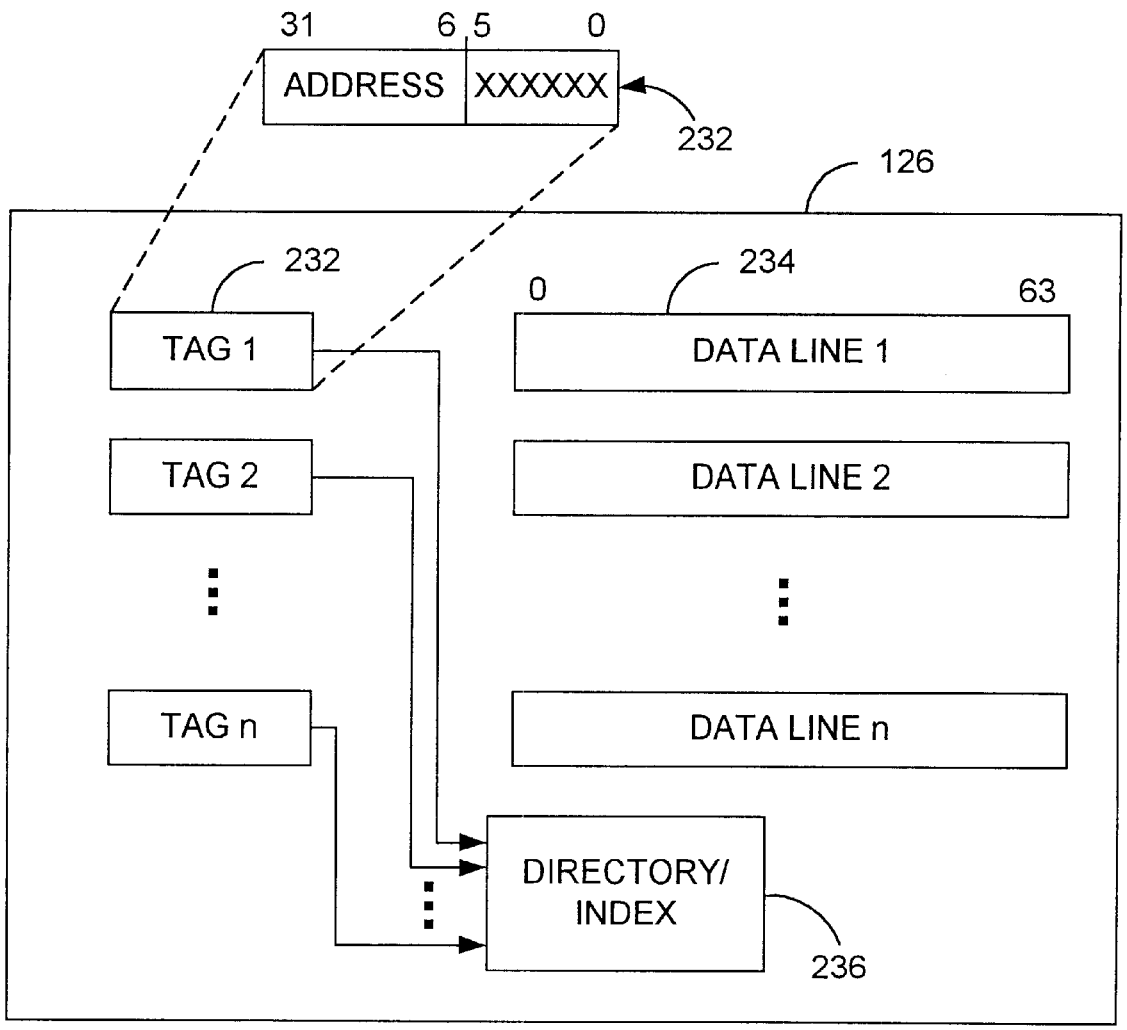
FIG. 2 is a block diagram illustrating certain fundamental components within a cache memory.

FIG. 2 is a block diagram that illustrates certain fundamental components of a cache memory 126. These fundamental components include a plurality of tags 232, a corresponding plurality of data lines 234, and a directory/index 236. As is known, cache tags 232 typically comprise a portion (the most significant bits) of the address bits that define blocks (lines) of memory location(s) of target data. The least significant bits (represented as don't care values) identify the specific position (within the blocks) to a target data value in the corresponding data line 234. In accordance with the preferred embodiment of the present convention, the cache memory 126 utilizes sixty-four byte data lines 234. Therefore, the six least significant bits of the address bits specify the particular location of a target data value within a given data line 234.

Also illustrated in FIG. 2 is a directory/index 236. As is known, the directory 236 maintains a log or database of the various tags 232. Upon start-up or initialization, there is no data stored within the cache memory 126, and therefore no tags are stored in the directory 236. Therefore, when a device requests data to be read from system memory 128, and entire line 234 is read from the system memory 128 into a data line 234 of the cache memory 126. The most significant bits of the address bus are written into the corresponding tag 232, which is stored in the directory 236. Upon the next request for data from a specified memory location, the cache memory 126 will examine the directory 236 to determine whether that data value is presently within the cache. If the data value is, in fact, within the cache memory 126, then it may be accessed and read out at high speed. If, however, the data value is not presently stored within the cache memory 126, then it is retrieved from the system memory and read into an available data line 234 of the cache memory 126. As before, the most significant bits of the address bus are written into a corresponding tag, and logged in the directory 236.

The foregoing process is repeated for subsequent requests for data from system memory 128. At some point, however, all data lines 234 of the cache memory 126 will be occupied. At this point, the cache memory 126 must discard at least one line 234 of data, in order to make space available for new data to be read into the cache 126. As previously mentioned, there are a wide variety of algorithms and methods that are known for determining which lines or lines 234 of data to discard from the cache 126. Preferably, an algorithm is chosen that will discard those data lines 234 which are least likely to be used again in the near future. As data is discarded from the cache 126, the directory 236 is updated accordingly to remove the corresponding tag(s) 232 from the directory space.

Operation of the Present Invention

Having described the environment of the inventive system as well as certain basics about cache memory devices, the discussion will now focus on the advancements of the present invention. As previously mentioned, the present invention is generally directed to a system and method for fetching data from system memory to a device in communication with the system over a PCI bus, via an I/O cache. Broadly, the present invention may be viewed as a novel way to communicate certain fetching hints; namely, hints that specify certain qualities about the data that is to be fetched from the system memory. In operation, the I/O cache may use such hints to more effectively manage the data that passes through it. As one simple example, if, based upon the hints, the controller for the I/O cache knew (or assumed) that the data being fetched was ATM data, then it would also know (based upon the nature of ATM data) that precisely a forty-eight byte data payload was to be sent to the requesting device, and the I/O cache could pre-fetch precisely this amount of data (typically one or two cache lines).

In accordance with one aspect of the invention, such a system includes an input/output (I/O) cache memory interposed between the system memory and the PCI bus, wherein the cache memory has internal memory space in the form of a plurality of data lines within the cache memory. The system further includes a plurality of registers for each PCI master that are configured to define fetching criteria. Finally, the system includes a register selector that is configured to select an active register among the plurality of registers, wherein fetching criteria for the device is specified by the active register.

More particularly, in such a system constructed in accordance with the preferred embodiment of the invention, the registers contain contents that specify certain hints with regard to data fetching. For example, one such hint may be a pre-fetch depth, whereby the registers may contain differing values of pre-fetch depth. A first register may specify a pre-fetch depth of two cache lines, while a second register may specify a pre-fetch depth of three cache lines. It will be appreciated, however, that these register contents may be dynamically varied by different sources. In one instance, system firmware may set the contents of the registers. Alternatively, the register contents may be set or altered under the control of a driver on the requesting device. The register selector then determines which register to "select" as the active register, which is the register used by the controller for the I/O cache for controlling the data therein. This selector may be configured to monitor the PCI bus to identify requests for data and, based on the manner of the request, the identification of the requesting device, or other factors, the selector "selects" the active register.

By way of a more specific example, consider a system that has two registers dedicated for each PCI bus master. Each of the registers may be configured to specify a different pre-fetch depth for the I/O cache, based upon the type of data transfer requested; namely, whether the request for data is an MR command, an MRL command, or an MRM command. For example, a first register (in each register set) may be configured to specify a pre-fetch depth of only one cache line for a MR command, a pre-fetch depth of two cache lines for a MRL command, and a pre-fetch depth of three cache lines for an MRM command. A second register (in each register set) may be configured to specify a pre-fetch depth of two cache lines for a MR command, a pre-fetch depth of three cache lines for a MRL command, and a pre-fetch depth of four cache lines for an MRM command. Continuing with the hypothetical, the register selector may be configured to select the first register of each register set if, for example, the fetched data is deemed to be a control-type data and to select the second register of each register set if, for example, the fetched data is deemed to be payload data. In accordance with one embodiment, the requesting device can control the operation of the register selector through the use of address bits. Specifically, address bits that are otherwise unused in identifying certain data may be used to specify the active register of a given register set.

It should be appreciated, however, that the concepts of the present invention are rather broad, and not limited to the specific use or implementation herein. In this regard, the present invention may be broadly characterized as a method for communicating fetching hints from a requesting device across a PCI bus.

In accordance with one application of the present invention, a method may be provided for managing data within an I/O cache memory. More particularly, a method may be provided for managing data within a cache memory in a system having a cache memory interposed between a system memory and an I/O bus. The method receives a request for data from the system memory and evaluates a set of pre-fetch hints associated with the request. Based on a pre-fetch hint associated with a given fetch, the method controls the retrieval and management of data within the cache memory.

In accordance with such an embodiment, the method may operate to monitor transactions on the I/O bus. Based upon the monitored transactions, the method may determine certain aspects about a given device that is in communication with the I/O bus. Based upon the determined aspects of the device, the method generates certain hints that may be used by the cache memory in order to optimize overall system performance. Preferably, these hints are stored in a set of registers which the cache memory accesses in response to a fetch request. Based upon these hints, the cache memory may pre-fetch a certain amount of data, limit the pre-fetch block size of data, aggressively flush data, or perform other tasks that allow for a more effective management of data within the cache memory.

In accordance with one aspect of the invention, the pre-fetch hints include an identification of a number of cache lines to pre-fetch into the cache memory. For example, if the pre-fetch hints reveal that the requesting device is an ATM device, then the method operates to pre-fetch 48 bytes of data. This will involve a pre-fetch of either one or two cache lines, depending upon the alignment of the first data byte within the first cache line. In accordance with another aspect, the pre-fetch hints include an identification of system memory boundary limitations, beyond which data will not be pre-fetched into the cache memory. In accordance with yet another aspect, the pre-fetch hints include an identification of a condition for flushing fetched data from the cache memory.

In accordance with a preferred embodiment of the invention, the pre-fetch hints may be generated based upon the method monitoring various PCI commands, including Memory Read (MR), Memory Read Line (MRL), and Memory Read Multiple (MRM) PCI fetch commands.

In accordance with yet another embodiment, an inventive feature may be viewed as a system for managing data within an I/O cache memory. The cache includes memory space comprising a plurality of data lines. The system further includes a device configured to evaluate communications between the cache memory and an I/O bus (preferable a PCI bus) and generate at least one set of pre-fetch hints based upon the evaluated communications. Finally, the system includes a memory manager configured to manage the data within the memory space, the memory manager further including logic configured to evaluate the pre-fetch hints to control the management of data within the memory space.

Preferably, the memory manager further includes first means for evaluating a fetch request, second means evaluating the pre-fetch hints, based upon the fetch request, and third means for controllably pre-fetching a predetermined number of cache lines of data based upon a value of the pre-fetch hint. As will be appreciated by those skilled in the art, the first, second, and third means are formed from circuitry, or a combination of circuitry and microcode, configured to perform the recited function of the respective means. The system further includes a lookup table for storing the pre-fetch hints.

Figure 3:
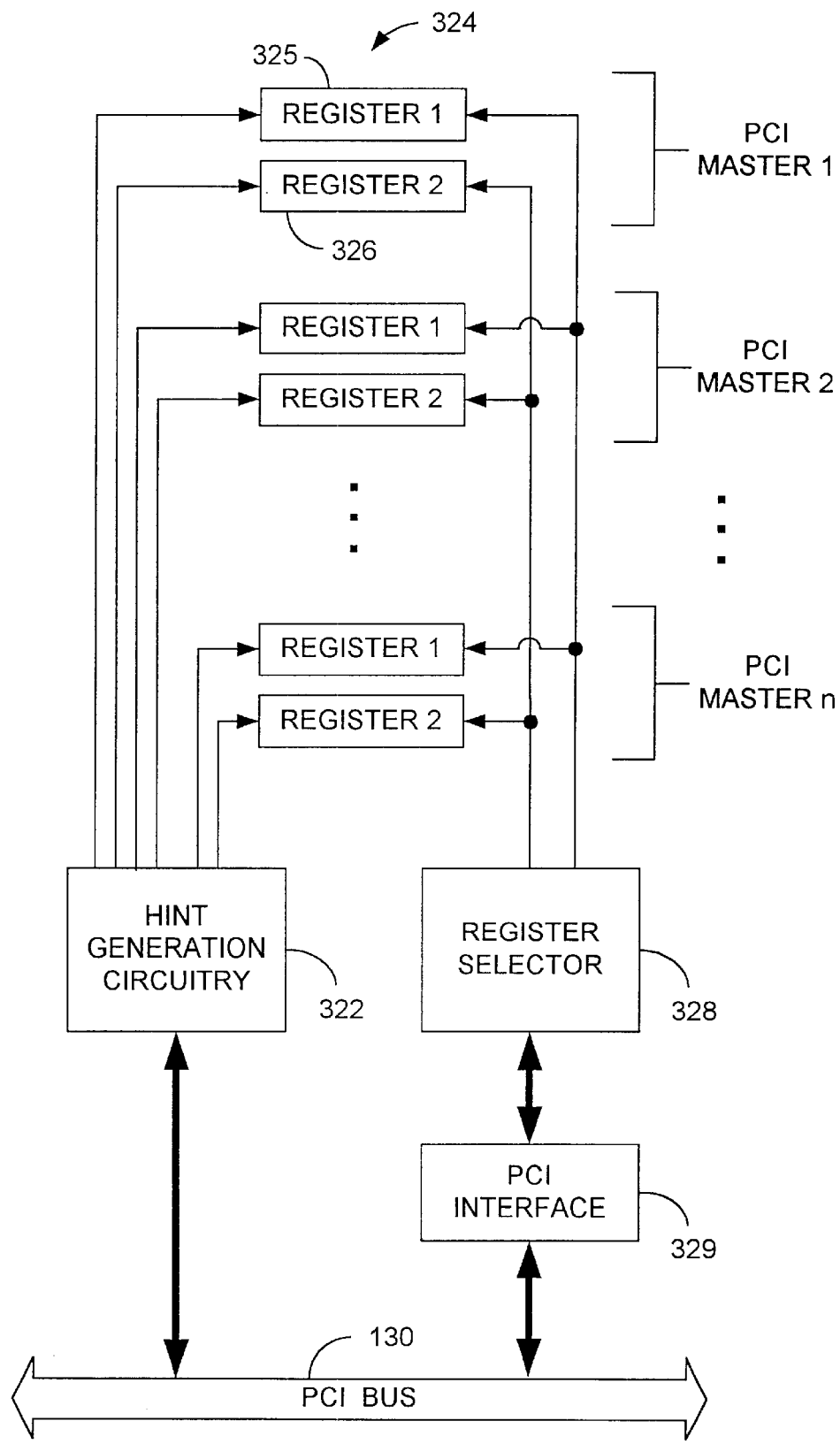
FIG. 3 is a block diagram illustrating certain components of a system constructed in accordance with the present invention.

Reference is now made to FIG. 3, which is a block diagram illustrating certain components of a system constructed in accordance with the present invention. As previously mentioned, the system of the present invention is broadly directed to a system that facilitates the communication of "hints" from a device across a PCI bus 130 to a host system. The "hints" may be a variety of things and may be used for many purposes. In accordance with one embodiment of the invention, the hints specify certain information about the requesting device and/or characteristics about the data that such a device uses. These hints may be used by the system to, for example, help manage data within an I/O cache (e.g., the hints may define a pre-fetch depth).

In accordance with the preferred embodiment of the present invention, the system uses a plurality of registers 324 that store information that define the "hints." Specifically, the preferred embodiment utilizes register groupings. As illustrated in FIG. 3, one embodiment of the invention employs a plurality of registers for each PCI master (a device that may drive the PCI bus). In the illustrated embodiment two registers are dedicated for, and associated with, each PCI master device. However, consistent with the concepts and teachings of the present invention, additional registers (if desired) could also be associate with each PCI master.

In accordance with the invention, each register may store a hint or a set of hints. In accordance with the preferred embodiment, and as will be described in more detail below, each register stores a set of hints. Therefore, two sets of hint are stored and associated with each PCI master device, in the illustrated embodiment. More particularly, consider the two registers 325 and 236 associated with the first PCI master. Making a broad generalization regarding data transfers across the PCI bus 130, data can generally be categorized as either control data or payload data. Control data typically comprises shorter blocks of data, while payload data generally comprises larger blocks of data. Therefore, a first register 325 may be used to store hints relating to the communication of control-type data, while a second register 326 may be used to store hints relating to the communication of payload-type data. During operation, the system selects one of these registers (for transfers for any given PCI master) as the "active" register.

A block labeled Hint Generation Circuitry 322 is illustrated to simply depict the notion that some mechanism is provided to generate the values that are stored in the various registers 324. As will be appreciated, these values may actually be derived in a number of different ways. Optimally, a given circuit card/PCI master may specifically generate these values. This approach, of course, presumes that the circuit card is specifically designed for the system of the present invention, or alternatively is provided with a software driver for such a system. Recognizing, however, that many such circuit card are generically designed to work with many different systems, the system may include circuitry, or some other mechanism, for specifically generating these register values. In this regard, the system may store default values upon initialization. However, the hint generation circuitry 322 may be configured to monitor PCI bus transactions between the individual PCI masters. By observing over time the nature of the bus traffic to a given device, the hint generation circuitry 322 may be configured to update the values stored within the various registers 325. In this way, the performance of even generic PCI cards may be significantly improved by a system constructed in accordance with the present invention.

In addition to the foregoing, register selector circuitry 328 is provided to specifically select the "active" register of any given register set or grouping. In accordance with the preferred embodiment, the active register is specified by using address bits that are otherwise unused. FIG. 3 further illustrates a PCI interface 329 which may be configured to monitor the transactions on the PCI bus. Collectively the PCI interface 329 and the register selector 328 specify the active register from any given register set. Again, the active register may be specified by the PCI master (if the PCI master is a non-generic card that has specific knowledge of the system of the invention), or may be specified by the system of the present invention.

To help illustrate the inventive concepts, the discussion that follows will describe the use of the present invention to facilitate data management in an I/O cache. In this environment, data written to or read from the system memory 128 is read through the cache memory device 126. Thus, when reading data from the system memory 128 to a device disposed along the PCI bus 130, data must first be read from the system memory 128 into memory space 304 (see FIG. 4) of the cache memory device 126.

While the cache memory device 126 of the illustrated embodiment may employ many methods or techniques for managing data that are conventional or otherwise well known in cache memory management, several new features are employed as well. In accordance with one aspect of the embodiment, the system may monitor bus traffic between the PCI bus 130 and the cache memory 126 to acquire certain insights into devices that are disposed along the PCI bus 130. In this regard, the system more particularly monitors, and keeps track of, bus traffic to and from particular device locations that specify unique devices in communication with the PCI bus 130. For example, an expansion card 140 (see FIG. 1) may be defined to have a particular I/O address, or range of addresses. Any reads and/or writes to and from this I/O address, or range of addresses, may be monitored by the system. Based upon the characteristics of the data transactions to and from this card, the system may make certain determinations about the nature of the card, and alter the manner that it manages data within the cache memory accordingly. Preferably, the data is managed in a way that optimizes overall system performance. Thus, it will be appreciated that a request to fetch data from system memory 128 to a first expansion card may be treated differently than a request to read data from memory to a second expansion card, based upon information collected by the present invention about the two respective cards.

By way of example, assume that one of the expansion cards is asynchronous transfer mode (ATM) communications device. If, by monitoring data transactions to and from that card, the system determines that the card is, indeed, an ATM card, then the invention may make certain assumptions about the data traffic to and from that card. Specifically, and as is known, in simple ATM devices, ATM data is transferred in packets comprising a five octet header portion, and a forty-eight byte data payload. Therefore, when an ATM device requests data from system memory 128, the system may assume that ultimately forty-eight sequential bytes will be requested from memory by the device. Therefore, the system may operate to immediately (upon receiving the request for the first byte of data) retrieve forty-eight bytes of data from the system memory 128 into the memory space 304 of the cache memory 126. This data can then be immediately (upon request from the PCI bus 130) written from the cache memory 126 to the PCI bus 130 without incurring the latency (i.e., delay of several cycles) that is typically incurred when a device on the PCI bus 130 requests data from memory 128. In accordance with the illustrated embodiment, the cache memory 126 retrieves data from the system memory 128 in groups of cache lines, rather than data bytes. Therefore, upon receiving a request for data, the system will immediately retrieve a full line of cache data. If, based upon the location of the first byte of data within the cache line, and the size of the cache line of the cache memory 126, the device of the system operates to pre-fetch at least one cache line of data and potentially two or three cache lines of data, as is needed in order to completely pre-fetch forty-eight bytes of data.

It will be appreciated, however, consistent with the concepts of the present invention, a variety of characteristics about different types of expansion cards, may be collected and used in a manner similar to that described above in connection with ATM cards, to optimize, or at least increase, the efficiency of the operation of a cache memory 126.

Figure 4:
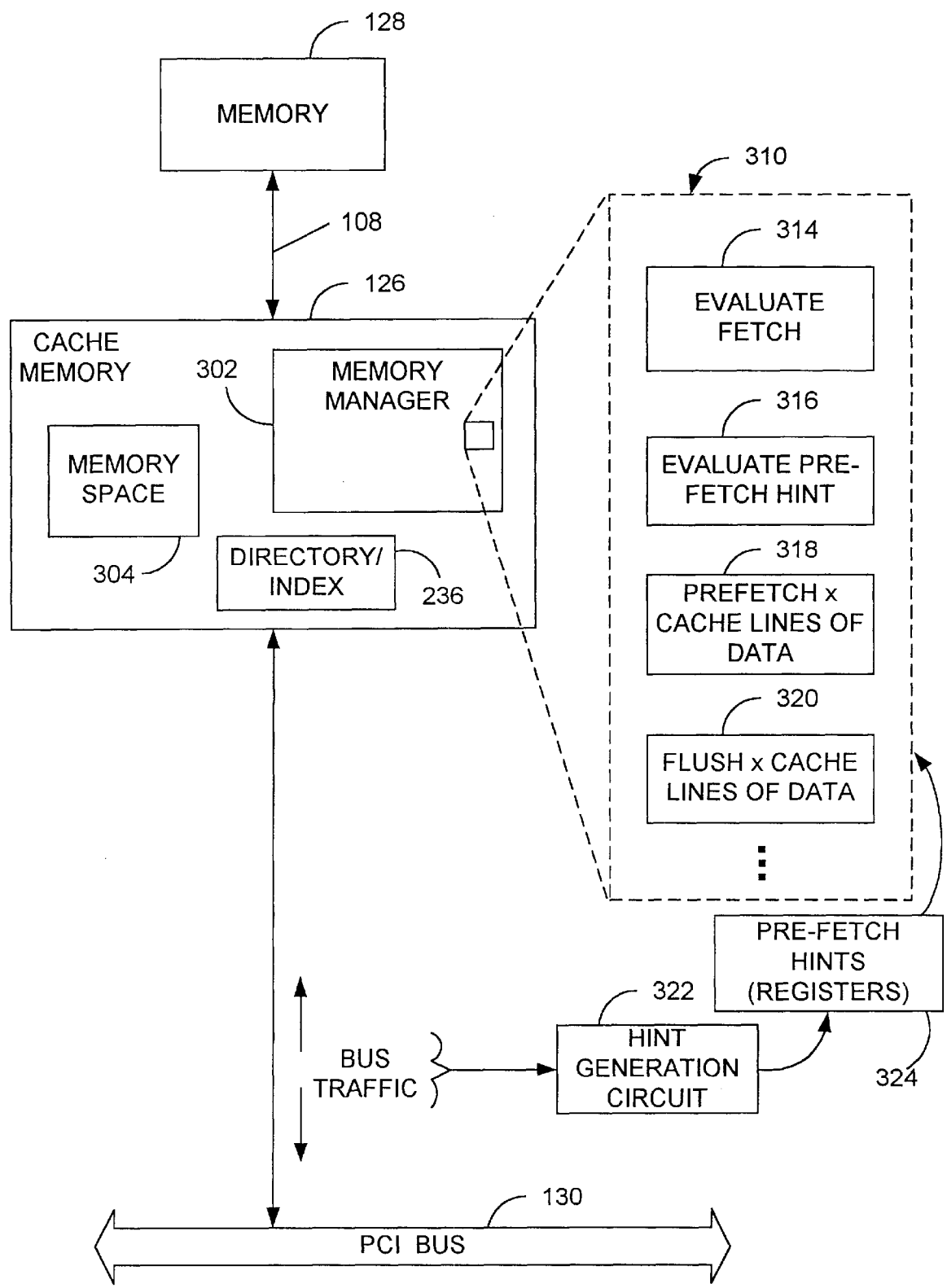
FIG. 4 is a block diagram illustrating certain components of a system constructed in accordance with the present invention.

In keeping with the description of FIG. 4, the cache memory device 126 is more particularly illustrated as containing memory space 304, a memory manager 302, and a directory/index 236 (described in connection with FIG. 2). The memory space 304 is partitioned into a plurality of cache lines. In accordance with one embodiment, the memory space 304 comprises sixteen cache lines, each line containing sixty-four bytes of data. However, consistent with the inventive concepts, different line sizes may be utilized. A memory manager 302 is also provided, and is comprised of circuitry (including microcode) to perform a variety of functions for controlling the operation of the cache memory 126, as well as managing the data within the memory space 304. Such tasks are well known by those skilled in the art, and therefore need not be described herein.

Instead, what will be described herein are only those portions which illustrate certain fundamental advancements made by a system utilizing the present invention. In this regard, the circuitry of the memory manager 302 includes a number of functional units, which may be comprised of discrete hardware, or hardware/microcode segments 310. One functional unit may be configured to evaluate a fetch command 314. A command received from a device disposed along the PCI bus 130 may be evaluated by the memory manager 302, to determine specifically what action is being requested. Another functional unit may be configured to evaluate a pre-fetch hint or a set of pre-fetch hints 316 that are associated with the fetch command evaluated by block 314. This function will be described in more detail below.

Yet another function provided by a system constructed in accordance with the invention is that function required to carry out a pre-fetch of a certain number "X" of cache lines of data 318, based in part upon the fetch command identified by block 314, and in part upon the pre-fetch hint (or hints) identified in block 316. As previously mentioned, if the fetch request is simply a request for a byte of data but the pre-fetch hint identifies the requesting device as being an ATM card, then block 318 may be configured to operate to pre-fetch at least one full cache line of data, and perhaps two or three cache lines of data, depending upon the location of the first byte (within the first cache line of data), as well as the size of the cache lines within the cache memory 126. In the cache memory device 126 of the preferred embodiment (having 64 byte cache lines), a request for data from an ATM card results in the pre-fetch of either one or two cache lines of data. More specifically, if the address of the first byte of data requested is within forty seven bytes of the end of the cache lines, then two full cache lines will be pre-fetched into the memory space 304.

Another functional unit of a system constructed in accordance with the invention may be one configured to flush a certain predetermined number "X" of cache lines of data 320. In continuing with the previous example, typically when an ATM device (or any I/O device for that matter) retrieves data from system memory 128, it will not re-request that same data in the near future. Therefore, once the data is written from the memory space 304 to the PCI bus 130, the memory manager 302 may assume that that data will not be accessed again in the near future, and therefore may flush it from the memory space 304. If, in response to a request for data from an ATM device, the invention were to pre-fetch two cache lines of data, then as soon as the last byte of the forty-eight bytes of data are written from the memory space 304 to the PCI bus 130, the invention may immediately flush those two lines of data from the memory space 304. By effectively managing the relatively small memory space 304 of cache 126 in an efficient way, the overall system performance and efficiency is improved.

In accordance with the present invention, bus traffic and data transactions between the PCI bus 130 and the cache memory 126 may be monitored in order to identify and determine the nature of devices on the PCI bus 130. This information may be utilized by a hint generation circuit 322 that is configured to generate a set of hints associated with a given device on the PCI bus 130. These hints may then be stored in a look up table 324, which stores a number of pre-fetch hints that then may be utilized by the various functional blocks 310 described above. In accordance with the preferred embodiment, the hint generation circuitry 322 monitors bus transactions such as memory reads. As is known, there are generally three commands used to read data from a system memory 128 to a device on a PCI bus 130. These include a Memory Read (MR) command, a Memory Read Line (MRL) command, and a Memory Read Multiple (MRM) command. These commands are defined by the PCI bus standard, but are loosely enforced. In this regard, the MR command is typically used when retrieving a single word of data from memory. The MRL command is used when retrieving several words of data from memory, but usually not extending across a cache line boundary. The MRM command is used when retrieving a relatively large number of bytes, or blocks of data from memory, extending across a cache line boundary. Based solely upon these commands, a memory manager 302 may be configured to pre-fetch data only upon receipt of an MRL or MRM command. In this regard, a memory manager 302 may be blindly configured to pre-fetch, for example, one cache line of data in response to a MRL command, in pre-fetch two or three cache lines of data in response to an MRM command.

However, and as is known, the PCI standard only loosely defines these commands, and there is no enforcement for their rigid adherence. Therefore, different manufacturers of differing expansion cards may program device drivers for the respective cards in different ways. For example, and in keeping with the example of an ATM device, a device driver for an ATM card may be written by a programmer that utilizes only the MR command. Therefore, systems of the prior art would not be configured to pre-fetch data from the system memory 128 (even though forty-eight bytes are to be successively fetched). That is, upon receiving the MR command, the memory manager 302 (without the benefit of the present invention) would assume that only one byte of data is to be retrieved from the system memory 128, and therefore additional pre-fetching need not be performed.

With, however, the benefits of the present invention, the hint generation circuitry 322 may determine that a particular expansion card, for example, always executes forty-eight consecutive MR commands to retrieve forty-eight consecutive bytes of data. From this information, the hint generation circuit 322 may assume that the device or expansion card at a given address along the PCI bus 130 is an ATM card. It may place certain hints regarding pre-fetching associated with this card into the look up table 324. Therefore, when a MR request is received from that device, the memory manager 302 of the present invention may operate to immediately pre-fetch forty-eight bytes of data (either one or two cache lines). Therefore, subsequent memory reads executed from the ATM device along the PCI bus 130 can be immediately retrieved from the memory space 304 of the cache memory 126, without suffering additional latency delays while the data is retrieved from the system memory 128. Of course, if it turns out that this assumption is wrong, there has been no great loss, and certainly no error encountered as the data pre-fetched from the memory 128 into the memory space 304 will simply not be requested from the PCI bus 130, and may be flushed from the memory space 304 by the memory manager 302 in due course. Further, it will be appreciated that the hint generation circuitry 322 may be configured to generate similar hints for a wide variety of expansion cards. In this regard, the present invention is not limited simply to the generation of hints in connection with an ATM-type expansion card, but rather an ATM card has been chosen and discussed simply to illustrate the broader aspects of the invention.

Figure 5:
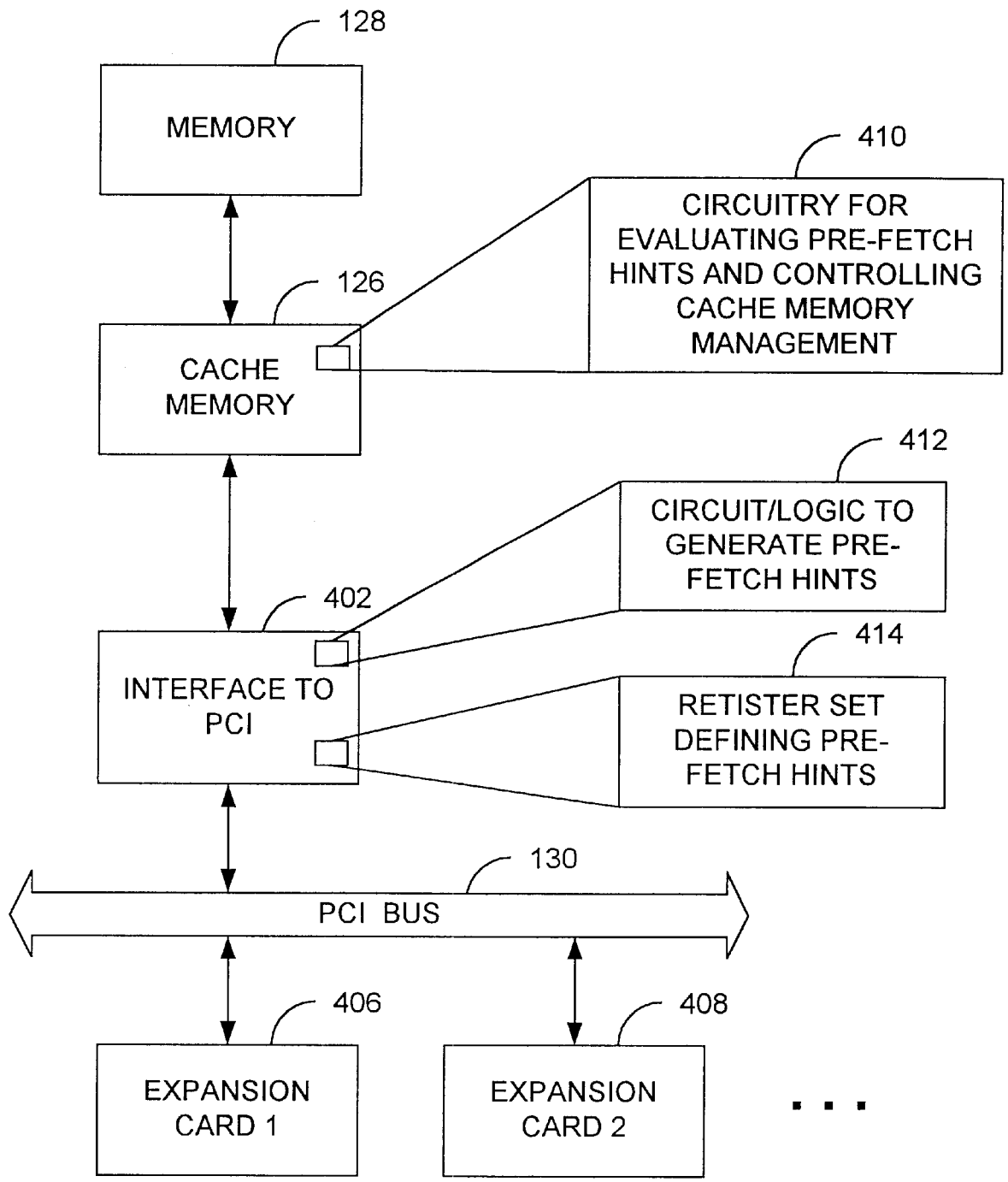
FIG. 5 is a block diagram illustrating other components of a system constructed in accordance with the present invention.

To more particularly illustrate the implementation of the invention in accordance with the preferred embodiment, reference is made to FIG. 5. In this regard, the hint generation circuitry 322 may be implemented in an interface 402 that is disposed between the cache memory 126 and the PCI bus 130. Expansion cards 406 and 408 (and others not shown) may be disposed in communication with the PCI bus 130. The cache memory device 126 may include circuitry 410 for evaluating pre-fetch hints and controlling cache memory management. This circuitry 410 corresponds in part to the memory manager 302 illustrated in connection with FIG. 3. Similarly, the interface 402 may include various circuit components that are collectively configured to provide the hint generation functional logic described in connection with FIG. 3. For example, a circuit or logic may be provided to generate pre-fetch hints 412. A separate circuit may include a register set defining certain pre-fetch hints 414. In accordance with the system of the preferred embodiment, the interface 402 may include a set of registers that define certain pre-fetch hints. In response to a given fetch request, these register values 414 are interpreted by circuitry within the cache memory 126 and are used in the management of data within the cache memory 126.

Figure 6:
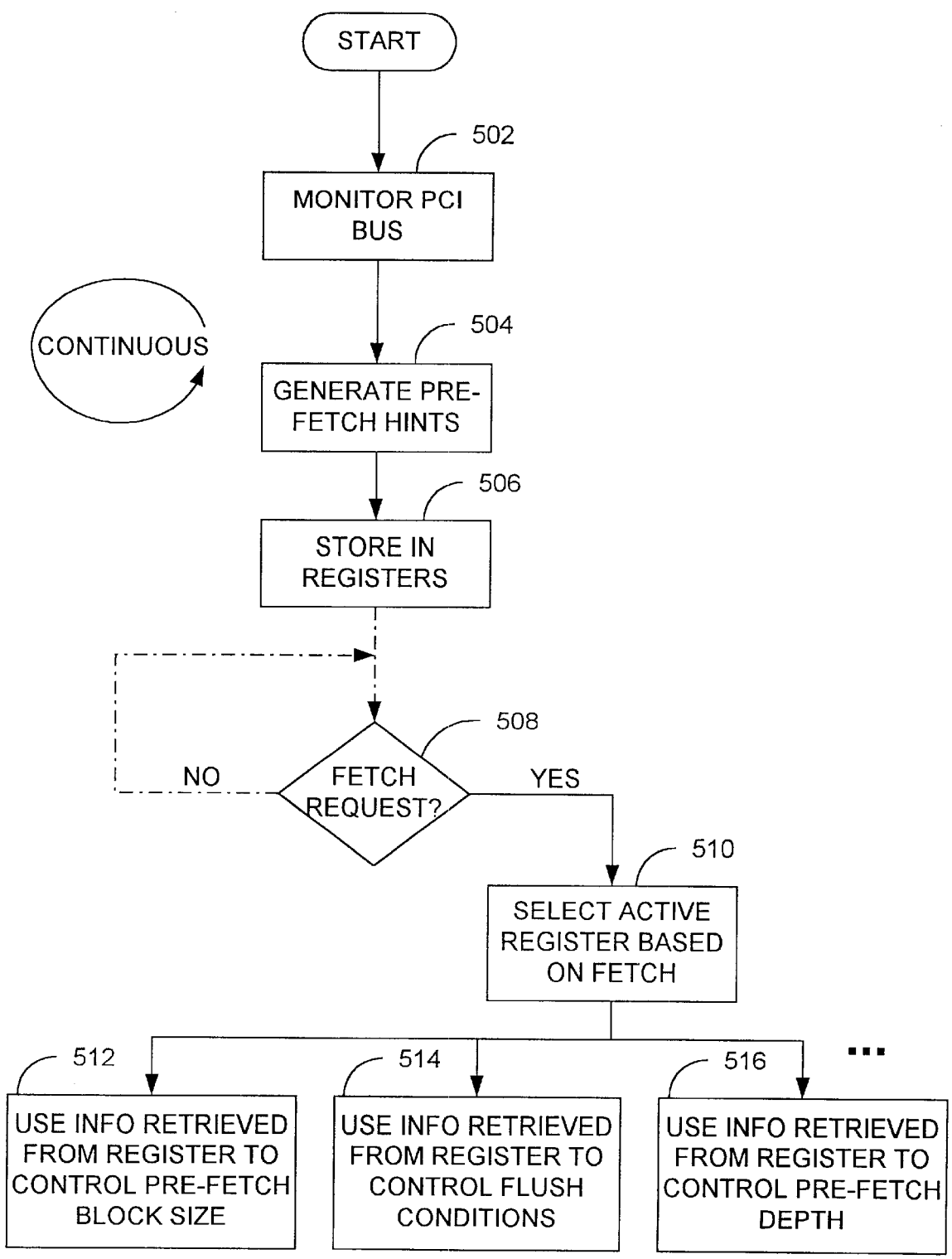
FIG. 6 is a flowchart illustrating the top-level functional operation of a system constructed in accordance with the invention.

Referring now to FIG. 6, a flow chart is shown that illustrates the top level functional operation of a method constructed in accordance with one implementation of the present invention. In this regard, the method includes steps of monitoring the PCI bus (and specifically transactions between the PCI bus and system memory 128) (step 502), and generating pre-fetch hints (step 504) based upon the bus transactions monitored in step 502. The various pre-fetch hints are then stored in a set of device registers (step 506).

These three steps 502, 504, and 506 may be continuously executed and the pre-fetch hints may be continuously updated for various cards in expansion slots or device in communication with the PCI bus 130. In operation, upon receiving a fetch request (step 508), the method selects an active register based upon the fetch (step 510), preferably using address bits. Based upon the pre-fetch hint or information retrieved from the register, various subsequent steps may be taken. For example, the information from the register may be used to control the pre-fetch block size, or block boundaries (step 512). That is, the information may be used to determine how much data to pre-fetch from the system memory 128 into the cache memory 304 (limited by certain boundaries). In accordance with another aspect of the invention, the information contained from the register may be used to control cache flushing conditions (step 514). As previously mentioned, many types of data (such as ATM data), once read from the memory space 304 to the PCI bus 130, may be immediately flushed from the cache memory space 304, upon the assumption that the data will not likely be used again in the near future. Similarly, data, or pre-fetch hints, retrieved from the register may be utilized to control the pre-fetch depth (step 516). This step is similar to step 512. However, the pre-fetch depth specifies the amount of data to pre-fetch into the memory space 304 of the cache memory 126. The block size of step 512 may be used to specify an address boundary across which the data will not be pre-fetched.

It will be appreciated that a variety differing functions may be employed to affect the operation of the memory manager 302. In accordance with the preferred embodiment of the invention, however, certain pre-fetch hints have been defined and are discussed below.

In accordance with the preferred embodiment of the present invention, a plurality of "HINTS" register is provided, and each is configured as set forth below.

TABLE 1

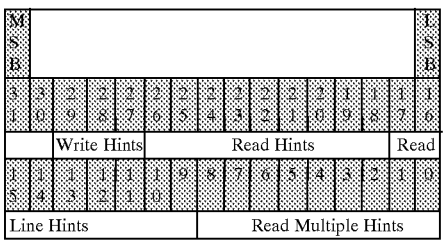

Specifically, this register is a thirty-two bit register, and contains a three bit field specifying Write Hints (bits 27–29), a nine bit field specifying Read Hints (bits 18–26), a nine bit field specifying Read Line Hints (bits 9–17), and a nine bit field specifying Read Multiple Hints (bits 0–8). A register of this format may form part of block 324 of FIG. 3, or block 414 of FIG. 4.

In fact, in accordance with a preferred embodiment of the present invention, a plurality of such "HINTS" registers, each in the form of TABLE 1 may be provided. PCI address bits may be used to specify which of the plurality of HINTS registers are used or accessed for a given transaction. For example, suppose there are four sets of HINTS registers, then two otherwise unused PCI address bits may be used to specify a given register. If the four registers are numbered zero, one, two, and three, the address bit values (binary) of 00, 01, 10, and 11 may be utilized to specify the respective HINTS registers. The specified HINTS registers is then interpreted by circuitry within the Memory Manager 302.

In accordance with the preferred embodiment, the Write Hints are selected when a Memory Write or Memory Write Invalidate command is used on PCI. The Read Hints are selected for a PCI Memory Read command. The Read Line Hints are selected for a PCI Memory Read Line command. And, the Read Multiple Hints are selected for a PCI Memory Read Multiple command. The action for each of the read commands, as interpreted by the Memory Manager 302 is as set forth in TABLE 2 below.

TABLE 2

| Bits | Hint Name | Hint Description |
|---|---|---|
| 0 | Aggressive Flush | Enables aggressive flushing. Memory Manager 302 will flush the cache line after it is transferred out. |
| 1 | PIOW/DMAR ordering | Enables ordering enforcement on DMA reads |
| 2 | Read Current | Causes cache line to be fetched as a Read Current transaction |
| 5:3 | Block size | Specifies the block size for reads (see TABLE 3) |
| 7:6 | Pre-fetch depth | Specifies the pre-fetch depth for reads |
| 8 | Pre-fetch lock | Specifies that the pre-fetch hint should not be adjusted as the read burst continues |

Specifically, the nine bit fields for each of the Read Hints, Read Line Hints, and Read Multiple Hints are defined to have the same hint description. Of course, consistent with the inventive concepts, these fields may be configured to have differing function or descriptions. Similar diverse functions or descriptions may be provided for the Write Hints field. In accordance with the preferred embodiment, however, the Write Hints field is defined by a fewer number of bits, because fewer options are presently provided. Specifically, at the present time only bit 0 is utilized and its state specifies whether an aggressive flush is to be performed. In an aggressive flush, the Memory Manager will flush the cache line as soon as the write update is completed.

To achieve reasonable throughput for DMA reads, pre-fetching is preferred. The level of pre-fetching is controlled by the pre-fetch and block size (See TABLE 3) hints supplied by the interface 402. The pre-fetch hint is a two-bit value specifying how many cache lines to pre-fetch for that burst. The preferred embodiment supports pre-fetch depths of zero, one, two, and three cache lines. A value of zero means that no pre-fetching is done; only the requested line is fetched. Values of one, two, and three mean that one, two, or three additional consecutive lines, respectively, will be fetched addition to the requested line. As the DMA burst consumes cache lines, additional cache lines will be pre-fetched.

The block size hint is a 3-bit field. The block size is used as hint for the length of a read burst. TABLE 3 (below) summarizes the meaning for each value of the hint. The values 0–3 specify a limit, based on the number of cache lines. The remaining values specify limits based upon address. A DMA sequencer and cache will switch between using cache line counts or address rollover tests depending upon the hint value.

TABLE 3

| Hint Value | Description |
|---|---|
| 0 | ATM Mode (Get 1 or 2 cache lines depending on the address and assuming an unaligned burst size of 48 bytes) |
| 1 | Get exactly 2 cache lines (128 B) |

TABLE 3-continued

| Hint Value | Description |
| --- | --- |
| 2 | Get exactly 3 cache lines (192 B) |
| 3 | Get exactly 4 cache lines (256 B) |
| 4 | Do not pre-fetch across 512 B boundary (8 lines) |
| 5 | Do not pre-fetch across 1 KB boundary (16 lines) |
| 6 | Do not pre-fetch across 2 KB boundary (32 lines) |
| 7 | Do not pre-fetch across 4 KB boundary (64 lines) |

Preferably, the block size hint takes precedence over the pre-fetch hint. The DMA sequencer increments and decrements the actual pre-fetch signal to the cache controller to obey the restrictions set by the block size. Additionally, the DMA sequencer adjusts the pre-fetch hint as the read burst continues to keep (pre-fetch hint+1) cache lines in-flight to the PCI bus. This is done for slow cards that might use a pre-fetch hint of 0 or 1; otherwise, the DMA sequencer would simply try to keep a read FIFO (not shown) full. This would result in wasted pre-fetching when the card disconnected, unnecessarily consuming processor bus bandwidth.

Adjusting the pre-fetch hint in the manner described above can have a detrimental affect on performance for extremely fast cards. For such a case the pre-fetch lock hint can be set, changing the DMA sequencer's behavior to keeping the read FIFO full. The pre-fetch lock hint should preferably be used with a pre-fetch depth of three, since its purpose is to keep the pipeline to the PCI bus 130 as full as possible.

The following are some guidelines for pre-fetching hints:

For the MR command, the hint will almost always be set to zero. The typical reason to use another value is to optimize performance of cards that fail to use MRL or MRM when they should have.

For the MRL command, hints of zero and one make sense. (Values of two or three could be used for a card that used MRL when it should have used MRM.) A card may use MRL for one of two reasons: (1) It is fetching some control information, say 32 or 64 bytes, and has no intention of fetching additional data from the cache line at the next address. (2) It may be fetching a large block of data but only has enough buffering in the interface for one cache line of data, so it only gets one cache line on each individual read. In the first case, the hint should be zero. In the latter case, the hint should be one, so that the next cache line is already in the cache when the device attempts the next read. Note, however, that this hint uses an extra line in the cache. So, if a single device is going to have many streams active simultaneously, setting the hint to zero might be a better idea even if large blocks are being read.

For the MRM command, values of two or three will likely make sense. The exact choice is dependent on the latency of the memory system and the frequency of operation for PCI. The pre-fetch lock hint might also need to be set.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for fetching data from a system memory to a device communicating over a PCI bus comprising:

an input/output (I/O) cache memory interposed between the system memory and the PCI bus, the cache memory having memory space in the form of a plurality of data lines within the cache memory;

a device configured to evaluate communications between the cache memory and an I/O bus and generate at least one set of pre-fetch hints based upon the evaluated communications; and memory manager means for managing the data within the memory space, the memory manager means further comprises means for evaluating the pre-fetch hints to control the management of data within the memory space.

2. The system as defined in claim 1, wherein the memory manager means further comprises:

means for evaluating a fetch request;

means evaluating the pre-fetch hints, based upon the fetch request; and means for controllably pre-fetching a predetermined number of cache lines of data based upon a value of the pre-fetch hint.

* * * * *